(12) United States Patent
Schmidt

(10) Patent No.: US 12,365,415 B2
(45) Date of Patent: Jul. 22, 2025

(54) HANDLEBAR ASSEMBLY FOR A MOTOR VEHICLE, AND MOTOR VEHICLE HAVING A HANDLEBAR ASSEMBLY OF THIS KIND

(71) Applicant: Bayerische Motoren Werke Aktiengesellschaft, Munich (DE)

(72) Inventor: Harry Schmidt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/709,564

(22) PCT Filed: Dec. 14, 2022

(86) PCT No.: PCT/EP2022/085863
§ 371 (c)(1),
(2) Date: May 13, 2024

(87) PCT Pub. No.: WO2023/134949
PCT Pub. Date: Jul. 20, 2023

(65) Prior Publication Data
US 2025/0026428 A1  Jan. 23, 2025

(30) Foreign Application Priority Data
Jan. 13, 2022  (DE) .................... 10 2022 100 679.4

(51) Int. Cl.
*B62K 11/14*  (2006.01)
*B62K 23/02*  (2006.01)

(52) U.S. Cl.
CPC .............. *B62K 11/14* (2013.01); *B62K 23/02* (2013.01)

(58) Field of Classification Search
CPC ........ B62K 11/14; B62K 23/02; B62K 23/04; B62K 23/06; B62M 25/08
See application file for complete search history.

(56) References Cited

U.S. PATENT DOCUMENTS

| 4,391,160 A * | 7/1983 | Myers ................... B62K 23/06 |
| | | 74/551.8 |
| 2003/0205102 A1* | 11/2003 | Barnett .................. B62K 23/06 |
| | | 74/502.2 |

(Continued)

FOREIGN PATENT DOCUMENTS

DE  60 2004 000 431 T2  10/2006
DE  10 2016 010 801 A1  3/2017

OTHER PUBLICATIONS

International Search Report (PCT/ISA/210) issued in PCT Application No. PCT/EP2022/085863 dated Mar. 16, 2023 with English translation (5 pages).

(Continued)

*Primary Examiner* — Daniel D Yabut
(74) *Attorney, Agent, or Firm* — Crowell & Moring LLP

(57) ABSTRACT

A handlebar assembly for a vehicle comprising at least one handlebar pipe extending along an axis and having a receiving portion with a circular cross-section. At least one stop means is fixed relative to the receiving portion. At least one shifting means is slidable via an opening therein onto the receiving portion, and can be arranged so as to rest, rotatably about the handlebar axis, against the receiving portion and against the stop means. An adjusting means is arranged on a side of the shifting means remote from the stop means so as to rest against the shifting means, and can be detachably fixed to the handlebar pipe. When detached from the handlebar pipe, the adjusting means releases the shifting means so as to be rotatable about the axis, and when fixed to the handlebar pipe, the adjusting means fixes the shifting means against rotation about the axis.

10 Claims, 1 Drawing Sheet

(56) References Cited

U.S. PATENT DOCUMENTS

2006/0169096 A1\* 8/2006 Barnett .................. B62K 23/06
                                                    74/551.8
2008/0184839 A1  8/2008 Negri et al.
2011/0271782 A1\* 11/2011 Perk ....................... A61G 5/048
                                                    74/484 R
2017/0080993 A1  3/2017 Bierwerth et al.

OTHER PUBLICATIONS

German-language Written Opinion (PCT/ISA/237) issued in PCT Application No. PCT/EP2022/085863 dated Mar. 16, 2023 with English translation (7 pages).

German-language Search Report issued in German Application No. 10 2022 100 679.4 dated Aug. 11, 2022 with partial English translation (11 pages).

\* cited by examiner

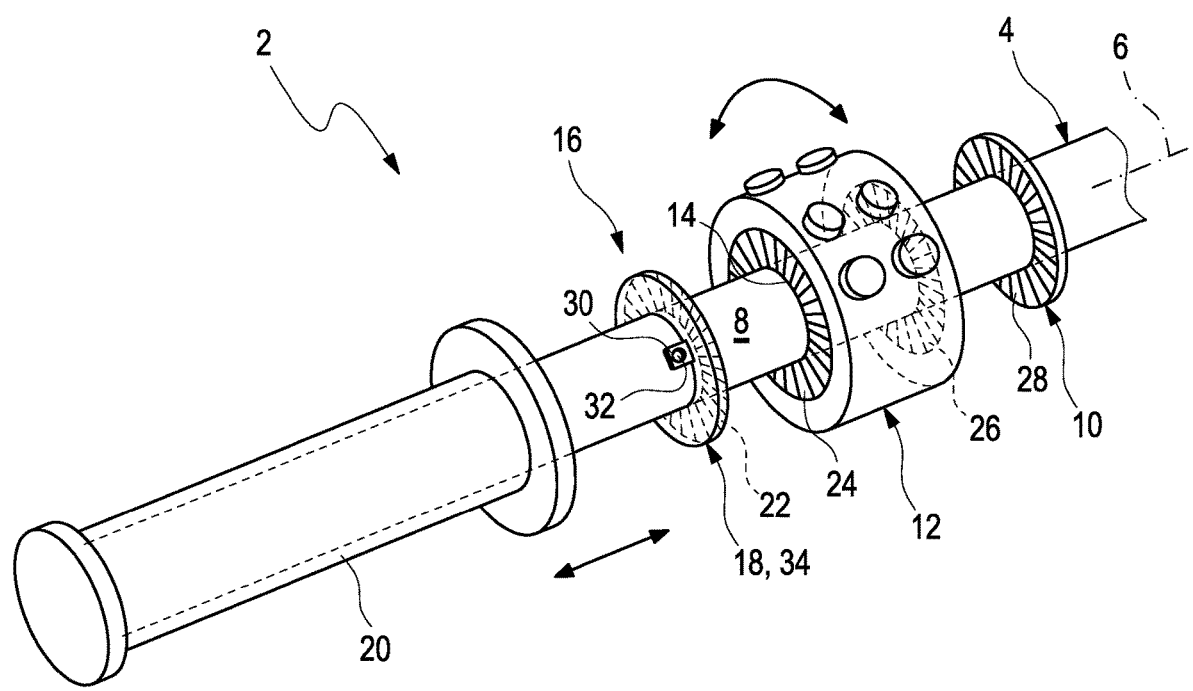

HANDLEBAR ASSEMBLY FOR A MOTOR VEHICLE, AND MOTOR VEHICLE HAVING A HANDLEBAR ASSEMBLY OF THIS KIND

BACKGROUND AND SUMMARY

This disclosure relates to a handlebar device for a motor vehicle, and to a motor vehicle having a handlebar device of this kind.

In the case of handlebar devices for motor vehicles, in particular for tilting vehicles, shifting means in the form of handlebar controls are pressed onto a handlebar tube and non-rotationally fixed at a uniform, defined distance from a handlebar and at a defined angle with respect to a user of the motor vehicle, in particular of the tilting vehicle.

During use of the motor vehicle, in particular of the tilting vehicle, by different users, such fixed handlebar controls may be positioned ergonomically unfavorably. For example, it may be difficult to reach a switch of the handlebar controls with a thumb if the user of the motor vehicle, in particular tilting vehicle, has hands which are smaller than average. Conversely, actuation of a switch may be difficult if the user of the tilting vehicle has hands which are larger than average.

In order to adapt a motor vehicle, in particular tilting vehicle, to a user, adjusting the handlebar controls is often not possible or has to be realized in a laborious and costly way only in a garage.

It is an object of an exemplary embodiment of the disclosure to propose a handlebar device for a motor vehicle, and a motor vehicle having a handlebar device of this kind, in which adjustment of the handlebar device to users having different ergonomic requirements is facilitated.

This object is achieved by a handlebar device for a motor vehicle, in particular tilting vehicle, having: i) at least one handlebar tube which extends along a handlebar axis and which has at least one receiving portion which comprises a circular cross section with respect to the handlebar axis; ii) at least one stop means which is fixed to the receiving portion of the handlebar tube or so as to adjoin the receiving portion of the handlebar tube; iii) at least one shifting means which can be pushed with an opening onto the receiving portion of the handlebar tube and can be arranged so as to rest against the receiving portion and against the stop means in a manner rotatable about the handlebar axis; iv) at least one adjustment unit which has an adjustment means which is arranged so as to rest against the shifting means on a side of the shifting means facing away from the stop means and can be fixed detachably and non-rotationally to the handlebar tube and which, in an arrangement detached from the handlebar tube, releases the shifting means for rotation about the handlebar axis and which, in an arrangement fixed to the handlebar tube, fixes the shifting means against rotation about the handlebar axis; and, vi) at least one handle which is fixed to the free end of the handlebar tube on the side of the adjustment means facing away from the shifting means.

Owing to the fact that the shifting means can be pushed on the receiving portion of the handlebar tube and can be arranged in a manner rotatable about a handlebar axis, the shifting means in the detached arrangement is easily adjustable with respect to an angle with reference to the user of the motor vehicle.

Owing to the fact that the handlebar device comprises at least one adjustment unit which has at least one adjustment means by which the shifting means, in the fixed arrangement of the adjustment means, is non-rotationally fixed, after the adjustment the shifting means can be non-rotationally fixed in a simple manner to the handlebar tube.

The shifting means may be handlebar controls with one or more switches or buttons. The one or more switches or buttons may be mounted to or within a housing.

The motor vehicle may comprise any desired motor vehicle, for example a passenger vehicle, a truck, a watercraft or an aircraft. Furthermore, the motor vehicle may comprise a tilting vehicle.

A tilting vehicle is understood as meaning bicycles, motor bikes or motor vehicles similar to motor bikes, such as motor scooters, in particular two-, three- or four-wheeled motor scooters, scooters, tiltable trikes, quad bikes or the like.

In principle, the adjustment means of the adjustment unit can fix the shifting means in the fixed arrangement in any way against rotation about the handlebar axis. It has proven advantageous if the adjustment means of the adjustment unit fixes the shifting means in a form-fitting and/or frictionally locking manner in the fixed arrangement, and/or if the shifting means is fixed clamped in a form-fitting and/or frictionally locking manner between the stop means and adjustment means in the fixed arrangement of the stop means.

By this means, the shifting means can be clamped in a simple manner against rotation about the handlebar tube axis by adjustment means and stop means in the fixed arrangement.

The adjustment means of the adjustment unit can be technically fixed in any way to the handlebar tube, for example clamped, latched or clipped. In order to be able to absorb high forces, it has proven advantageous if the handlebar tube comprises at least one receiving opening which extends transversely with respect to the handlebar axis, and if the adjustment unit comprises a fixing portion which is fixed to the adjustment means on the side of the adjustment body facing the handle and which has a continuous opening, wherein, in order to arrange the adjustment unit in the fixed arrangement, a bolt- or screw-like fixing means can be arranged in a continuous opening in the fixing portion and receiving opening of the handlebar tube.

In such a case, the adjustment means to which the fixing portion is fixed can be screwed in a simple manner to the handlebar tube.

In order to provide the forces acting between the adjustment means and the shifting means for non-rotationally fixing the shifting means to the handlebar tube, it has proven advantageous if the form-fitting and/or frictionally locking connection formed between the adjustment means of the adjustment unit and shifting means in the fixed arrangement comprises at least one coupling portion of the adjustment means, the coupling portion projecting in certain sections in the direction of the shifting means and/or springing back in certain sections, and at least one first surface portion of the shifting means, the first surface portion being arranged on the side of the shifting means facing the adjustment means and projecting in certain sections in the direction of the adjustment means and/or springing back in certain sections and being formed in a corresponding, in particular complementary, manner with respect to the coupling portion of the adjustment means.

Exemplary embodiments are conceivable in which the adjustment unit comprises just a single coupling portion projecting in the manner of a rib in the direction of the shifting means and the shifting means comprises a single springing-back first surface portion which is in the form of an opening and in which the rib means is engageable. In such a case, a form-fitting connection is formed.

Furthermore, the adjustment means can comprise a plurality of projecting coupling portions which can engage in a plurality of springing-back surface portions of the shifting means.

In a similar way as between the adjustment means and shifting means, a configuration of this kind can also be provided between the stop means and shifting means. In such a case, it has proven advantageous if the form-fitting and/or frictionally locking connection formed between the stop means and shifting means in the fixed arrangement comprises at least one stop portion of the stop means, the stop portion projecting in certain sections in the direction of the shifting means and/or springing back in certain sections, and at least one second surface portion of the shifting means, the second surface portion being arranged on the side of the shifting means facing the stop means, projecting in certain sections in the direction of the stop means and/or springing back in certain sections and being formed in a corresponding, in particular complementary, manner with respect to the stop portion of the stop means.

In order to be able to rotate and arrange the shifting means in a multiplicity of discrete positions in order to be able to fix the shifting means, for example, in different angular positions corresponding to the ergonomics of the respective user, embodiments of the last-mentioned inventive concepts are preferred, in which the form-fitting and/or frictionally locking connection formed between the adjustment means of the adjustment unit and shifting means in the fixed arrangement is formed by a plurality of alternating coupling portions of the adjustment means, the coupling portions being distributed over the surface uniformly, in particular radially symmetrically with respect to the handlebar axis and projecting in certain sections in the direction of the shifting means and/or springing back in certain sections, and by a plurality of alternating first surface portions of the shifting means, the first surface portions being distributed over the surface uniformly, in particular radially symmetrically with respect to the handlebar axis and projecting in certain sections and/or springing back in certain sections, and/or in which the form-fitting and/or frictionally locking connection formed between the stop means and shifting means in the fixed arrangement is formed by a plurality of alternating stop portions of the stop means, the stop portions being distributed over the surface uniformly, in particular radially symmetrically with respect to the handlebar axis and projecting in certain sections and/or springing back in certain sections, and by a plurality of alternating second surface portions of the shifting means, the second surface portions being distributed over the surface uniformly, in particular radially symmetrically with respect to the handlebar axis and projecting in certain sections and/or springing back in certain sections.

Through this configuration, the shifting means can be fixed in a certain angular position in discrete angular steps.

Furthermore, embodiments of the handle device are conceivable, in which the adjustment means rests with a substantially flat surface against a substantially flat surface of the shifting means and fixes the shifting means exclusively by a force-fitting connection or frictionally locking connection.

In a corresponding manner, the shifting means in such a case can likewise be placed with a substantially flat surface against a stop means with a substantially flat surface. In such a case, the shifting means can be clamped infinitely variably in different angular positions.

Furthermore, in a development of the handlebar device, it is provided that the at least one adjustment means of the adjustment unit comprises at least one spacer element by means of which an extent of the adjustment unit parallel to the handlebar axis is adjustable in order to reduce or to increase a distance between the handle and shifting means.

Provision of at least one spacer element makes it possible for the adjustment means of the adjustment unit to produce not only a certain angle of the shifting means with respect to a user, but also to set a distance between the handle and shifting means. Thus, in the case of users with hands smaller than average, a particularly small distance between the handle and shifting means can be realized, whereas in the case of users with hands larger than average, a distance between the handle and shifting means can be increased.

The spacer element can be designed technically as desired provided that it fulfills the technical function of increasing or reducing the overall extent of the adjustment unit parallel to the handlebar axis. In such a case, the spacer element may be telescopic.

Furthermore, it has proven advantageous in embodiments of the handlebar device if the adjustment means is formed by a single spacer element which can be arranged interchangeably and can be selected from a plurality of spacer elements each having an extent of differing size parallel to the handlebar axis, the spacer elements each having the coupling portion and the fixing portion, and/or if the adjustment means comprises at least two spacer elements which can be fixed non-rotationally to each other, wherein one of the at least two spacer elements comprises the coupling portion and wherein at least one of the at least two spacer elements comprises the fixing portion.

If the adjustment means is formed by a single spacer element which can be arranged interchangeably, the spacer element may comprise a plurality of spacer elements each having an extent of differing size parallel to the handlebar axis. Depending on the ergonomics of the user of the handlebar device, use can be made of a spacer element in the adjustment device which corresponds to the ergonomics of the user of the vehicle.

If the adjustment means comprises at least two spacer elements which can be fixed non-rotationally to each other, a distance between the handle and shifting means can be adjusted cost-effectively in a simple manner by additionally arranging spacer elements or by removing existing spacer elements.

In an aspect of the embodiment above, it has proven advantageous if the at least two spacer elements are fixed non-rotationally to each other by means of a form-fitting connection and/or frictionally locking connection, and/or if the adjustment unit comprises at least one fixing element by means of which at least two of the at least two spacer elements are fixed non-rotationally to each other and/or with respect to each other.

Finally, the object above is achieved by a motor vehicle, in particular tilting vehicle, having a vehicle frame with at least one handlebar device and at least one of the previously mentioned features, which can be fixed to the vehicle frame.

Further features, details and advantages of the disclosure emerge from the attached claims, from the graphical illustration and description below of a preferred embodiment of the handlebar device.

BRIEF DESCRIPTION OF THE DRAWING

FIG. 1 shows a perspective exploded front view of an exemplary embodiment of the handlebar device.

DETAILED DESCRIPTION OF THE DRAWING

FIG. 1 shows an exemplary embodiment of a handlebar device, provided overall with the reference sign 2, for a motor vehicle, in particular tilting vehicle.

The handlebar device 2 comprises a handlebar tube 4 which extends along a handlebar axis 6. The handlebar tube 4 comprises a receiving portion 8 which comprises a circular cross section with respect to the handlebar axis 6.

The handlebar device 2 comprises a stop 10, or stop means 10 which, in the exemplary embodiment shown in FIG. 1, is fixed to the receiving portion 8 of the handlebar tube 4. Furthermore, the handlebar device 2 comprises a shifting means 12 which can be pushed with an opening 14 onto the receiving portion 8 of the handlebar tube 4 and is rotatable about the handlebar axis 6.

In order to fix the shifting means 12 non-rotationally to the handlebar tube 4, the handlebar device 2 comprises an adjustment unit 16 which, in the exemplary embodiment shown in FIG. 1, comprises an adjustment means 18 which is arranged so as to rest against the shifting means 12 on a side of the shifting means 12 facing away from the stop means 10 and which can be fixed detachably and non-rotationally to the handlebar tube 4. The adjustment means 18 of the adjustment unit 16 can be transferred from a detached arrangement, in which adjustment means 18 and shifting means 12 are rotatable about the handlebar axis 6 and are movable along the handlebar axis 6, into a fixed arrangement, in which the adjustment means 18 fixes the shifting means 12 non-rotationally to the handlebar tube 4.

Furthermore, the handlebar device 2 comprises a handle 20 which is fixed to the free end of the handlebar tube 4 on the side of the adjustment means 18 facing away from the shifting means 12.

In the exemplary embodiment shown in FIG. 1, the shifting means 12 is fixed in a form-fitting manner between the adjustment means 18 and stop means 10. For this purpose, the adjustment means 18, on the side facing the shifting means 12, comprises a plurality of alternating coupling portions 22 (for example, ridges and/or valleys, teeth and/or detents, etc.), the coupling portions being distributed over the surface uniformly, in particular radially symmetrically with respect to the handlebar axis 6 and projecting in certain sections in the direction of the shifting means 12 and engaging in projecting or springing-back first surface portions 24 (for example, valleys and/or ridges, detents and/or teeth, etc.) of the shifting means 12, the first surface portions being formed in a corresponding, in particular complementary, manner.

Correspondingly, the shifting means 12, on the side facing the stop means 10, comprises projecting and/or springing-back second surface portions 26 (for example, ridges and/or valleys, teeth and/or detents, etc.), the second surface portions being distributed over the surface, in particular distributed radially symmetrically with respect to the handlebar axis 6 and engaging in stop portions 28 (for example, valleys and/or ridges, detents and/or teeth, etc.) of the stop means 10 projecting in certain sections and/or springing back in certain sections.

For the non-rotational fixing of the at least one adjustment means 18 of the adjustment unit 16, the adjustment unit 16 comprises a fixing portion 30 (for example, a plate) which is fixed to the adjustment means 18 and which comprises a continuous opening 32 through which a fixing means (for example, a screw) can be inserted in order to reach through the continuous opening 32 and to be arranged in a receiving opening in the handlebar tube 4, thereby fixing the fixing portion relative to the handlebar tube 4. The receiving opening in the handlebar tube 4 cannot be seen in FIG. 1.

In the exemplary embodiment shown in the FIGURES, the adjustment means 18 comprises a spacer element 34 by which a distance between the handle 20 and shifting means 12 is adjustable. In the exemplary embodiment shown in FIG. 1, the fixing portion 30 and the coupling portions 22 are fixed directly to the spacer element 34.

The manner of operation of the handlebar device 2 according to the disclosure is described briefly below:

In order to adjust an angle of the shifting means 12 in order to be able to be operated in an ergonomically favorable manner by a user of the tilting vehicle, the shifting means 12 is pushed onto the handlebar tube 4 and rotated with respect to the handlebar axis 6 until the desired angle is reached. Subsequently, the adjustment means 18 is brought into engagement with the shifting means 12, and at the same time the shifting means 12 is brought into engagement with the stop means 10. In the process, the coupling portions 22 are brought into engagement with the first surface portions 24, and the stop portions 28 are brought into engagement with the second surface portions 26. The adjustment means 18 is then fixed against a movement along the handlebar axis 6 by a fixing means which reaches through the opening 14 and is arranged in a receiving opening of the handlebar tube 4.

In order to adjust a distance of the handle 20 from the shifting means 12, one or more spacer elements 34 is or are pushed onto the handlebar tube 4, the spacer elements comprise elements of the adjustment unit 16. By this means, a distance between the handle 20 and shifting means 12 is adjustable.

The features of the disclosure disclosed in the above description, in the claims and in the drawings may be essential both individually and also in any desired combination in the realization of the disclosure in its various embodiments.

LIST OF REFERENCE SIGNS 2 handlebar device
4 handlebar tube
6 handlebar axis
8 receiving portion
10 stop means
12 shifting means
14 opening
16 adjustment unit
18 adjustment means
20 handle
22 coupling portion
24 first surface portion
26 second surface portion
28 stop portion
30 fixing portion
32 continuous opening
34 spacer element

What is claimed is:

1. A handlebar device for a motor vehicle comprising:
at least one handlebar tube extending along a handlebar axis and having at least one receiving portion comprising a circular cross section with respect to the handlebar axis;
at least one stop means fixed relative to the receiving portion of the handlebar tube;
at least one shifting means pushed via an opening onto the receiving portion of the handlebar tube, which can be arranged so as to rest against the receiving portion and against the stop means in a manner rotatable about the handlebar axis;

at least one adjustment unit having an adjustment means arranged so as to rest against the shifting means on a side of the shifting means facing away from the stop means, and which can be fixed detachably and non-rotationally to the handlebar tube, wherein in an arrangement detached from the handlebar tube, the adjustment means releases the shifting means for rotation about the handlebar axis, and wherein in an arrangement fixed to the handlebar tube, the adjustment means fixes the shifting means against rotation about the handlebar axis; and, at least one handle fixed to the free end of the handlebar tube on the side of the adjustment means facing away from the shifting means.

2. The handlebar device according to claim 1, wherein:
the adjustment means of the adjustment unit fixes the shifting means in a form-fitting and/or frictionally locking manner in the fixed arrangement, and/or
the shifting means is fixed clamped in a form-fitting and/or frictionally locking manner between the stop means and adjustment means in the fixed arrangement.

3. The handlebar device according to claim 2, wherein:
the form-fitting and/or frictionally locking connection formed between the adjustment means of the adjustment unit and shifting means in the fixed arrangement comprises:
at least one coupling portion of the adjustment means, the coupling portion projecting in certain sections in the direction of the shifting means and/or springing back in certain sections, and
at least one first surface portion of the shifting means, the first surface portion being arranged on the side of the shifting means facing the adjustment means and projecting in certain sections in the direction of the adjustment means and/or springing back in certain sections, wherein the at least one first surface portion of the shifting means is formed in a corresponding manner with respect to the coupling portion of the adjustment means.

4. The handlebar device according to claim 3, wherein:
the form-fitting and/or frictionally locking connection formed between the adjustment means of the adjustment unit and shifting means in the fixed arrangement is formed by i) a plurality of alternating coupling portions of the adjustment means, the coupling portions being distributed over the surface uniformly and projecting in certain sections in the direction of the shifting means and/or springing back in certain sections, and ii) a plurality of alternating first surface portions of the shifting means, the surface portions being distributed over the surface uniformly and projecting in certain sections and/or springing back in certain sections, and/or
the form-fitting and/or frictionally locking connection formed between the stop means and shifting means in the fixed arrangement is formed by i) a plurality of alternating stop portions of the stop means, the stop portions being distributed over the surface uniformly and projecting in certain sections of the shifting means and/or springing back in certain sections, and ii) a plurality of alternating second surface portions of the shifting means, the second surface portions being distributed over the surface uniformly and projecting in certain sections and/or springing back in certain sections.

5. The handlebar device according to claim 2, wherein:
the form-fitting and/or frictionally locking connection formed between the stop means and shifting means in the fixed arrangement comprises:
at least one stop portion of the stop means, the stop portion projecting in certain sections in the direction of the shifting means and/or springing back in certain sections, and
at least one second surface portion of the shifting means, the second surface portion being arranged on the side of the shifting means facing the stop means, projecting in certain sections in the direction of the stop means and/or springing back in certain sections, wherein the at least one second surface portion is formed in a corresponding manner with respect to the stop portion of the stop means.

6. The handlebar device according to claim 1, wherein:
the handlebar tube comprises at least one receiving opening which extends transversely with respect to the handlebar axis,
the adjustment unit comprises a fixing portion which is fixed to the adjustment means on the side of the adjustment body facing the handle and which has a continuous opening,
wherein, in order to arrange the adjustment unit in the fixed arrangement, a bolt—or screw fixing means can be arranged in a continuous opening in the fixing portion and receiving opening of the handlebar tube.

7. The handlebar device according to claim 1, wherein:
the at least one adjustment means of the adjustment unit comprises at least one spacer element via which a position of the adjustment unit is adjustable in order to reduce or to increase a distance between the handle and shifting means.

8. The handlebar device according to claim 7, wherein:
the adjustment means is formed by a single spacer element which can be arranged interchangeably and can be selected from a plurality of spacer elements each having an extent of differing size parallel to the handlebar axis, the spacer elements each having the coupling portion and the fixing portion, and/or
the adjustment means comprises at least two spacer elements which can be fixed non-rotationally to each other, wherein one of the at least two spacer elements comprises the coupling portion, and wherein at least one of the at least two spacer elements comprises the fixing portion.

9. The handlebar device according to claim 8, wherein:
the at least two spacer elements are fixed non-rotationally to each other by means of a form-fitting connection and/or frictionally locking connection, and/or
the adjustment unit comprises at least one fixing element via which at least two of the at least two spacer elements are fixed non-rotationally to each other.

10. A motor vehicle having a vehicle frame and having at least one handlebar device according to claim 1, which is fixed to the vehicle frame.

* * * * *